United States Patent [19]
Jacquinot et al.

[11] Patent Number: 6,136,912
[45] Date of Patent: Oct. 24, 2000

[54] SILICOACRYLIC COMPOSITIONS, PREPARATION PROCESS AND USE FOR OBTAINING COATINGS WHICH ARE HARDENABLE THERMALLY OR BY RADIATION

[75] Inventors: Eric Jacquinot, Trosly Breuil; Armand Eranian, Courbevoie, both of France

[73] Assignee: Clariant (France) S.A., Puteaux, France

[21] Appl. No.: 09/206,283

[22] Filed: Dec. 7, 1998

[30]    Foreign Application Priority Data

Dec. 23, 1997 [FR]    France .................................. 97 16321

[51] Int. Cl.[7] ....................................................... C08K 3/00
[52] U.S. Cl. ............................................ 524/492; 524/493
[58] Field of Search ...................... 524/492, 493

[56]    References Cited

U.S. PATENT DOCUMENTS 5,232,964    8/1993    Evans .

FOREIGN PATENT DOCUMENTS 0317858    5/1989    European Pat. Off. .
0565403    11/1993   European Pat. Off. .
0607710    7/1994    European Pat. Off. .

*Primary Examiner*—Edward J. Cain
*Attorney, Agent, or Firm*—Browdy and Neimark

[57]    ABSTRACT

Silicoacrylic compositions which are fluid, polymerizable thermally or by radiation, by a radicular mechanism, with a very low water (less than 1.5%) and volatile solvent content containing silica, a silane and a multifunctional acrylic monomer, in which the silica is in the form of individualized particles, with an average diameter comprised between 5 and 100 nm, not linked together with siloxane bonds, the silane is a vinylsilane of formula (1)

$$H_2C=CH-Si(OR)_3 \qquad (I)$$

in which R represents a methyl or ethyl radical, in which the multifunctional acrylic monomer is tripropylene glycol diacrylate designated TPGDA, the quantity of vinylsilane of formula I is comprised between 0.01 millimole and 0.1 millimole per $m^2$ of silica used and which are transparent and colourless as water and stable over time and preparation process.

20 Claims, No Drawings

SILICOACRYLIC COMPOSITIONS, PREPARATION PROCESS AND USE FOR OBTAINING COATINGS WHICH ARE HARDENABLE THERMALLY OR BY RADIATION

The present invention relates to silicoacrylic compositions which are fluid, transparent and as colourless as water, stable over time, polymerizable thermally or by radiation, by a radicular mechanism, with a very low water and volatile solvent content, their preparation process and their use for obtaining coatings which are resistant to abrasion and scratching.

Synthetic organic polymers and more particularly organic polymers which are transparent to sunlight such as certain (meth) acrylic or terephthalic resins are limited in their development by their low resistance to abrasion and their tendency to scratch. In order to overcome these drawbacks, it is often proposed to protect them with an anti-scratch anti-abrasion coating by photopolymerization in the presence of a photo-initiator, of a film of an aqueous or non-aqueous composition, containing silica particles, one or more polymerizable acrylic monomers and optionally one or more silanes. Among these latter compositions, there can be mentioned among others, those described in the patents U.S. Pat. Nos. 4,348,462, 4,455,205, 4,478,876, 4,486,504, 4,491,508, 4,822,828, 5,260,350, 5,374,483, 5,232,964 and EP-A-317,858.

According to EP-A-317,858, compositions are prepared in a solvent medium containing a partial condensate of colloidal silica with a silane of which at least 60% is of vinylsilane type, a monomer of multi(meth)acrylate type, preferably soluble in water, and a lower alkanol, preferably isopropanol. It is this mixture in a solvent medium which is applied onto synthetic films in order to obtain abrasion resistant coatings. These compositions contain relatively significant quantities of solvent which must be evaporated off on use.

According to U.S. Pat. No. 5,232,964, a composition is prepared which forms a coating which is transparent, colourable and resistant to abrasion after hardening with radiation, containing at least one multifunctional acrylate monomer, a silane, colloidal silica dispersed in a solvent and a quaternary ammonium salt which provides the colurability.

Although the compositions described in these documents allow coatings to be obtained presenting good performances both as regards protection against abrasion and scratching and as regards adhesion, compositions are still at present being sought which have even more improved qualities in particular as regards cost, fluidity and stability. Now, the Applicant has discovered compositions which are fluid, transparent and colourless as water, stable over time, polymerizable thermally or by radiation, by a radicular mechanism, with a high concentration of silica, with a very low water and volatile solvent content, producing after polymerization a coating which is hard, adhesive and having a good resistance to abrasion and scratching.

Therefore, the present invention relates to silicoacrylic compositions which are fluid, transparent and colourless as water, stable over time, polymerizable thermally or by radiation, by a radicular mechanism, with a very low water and volatile solvent content containing silica, a silane and a multifunctional acrylic monomer, characterized in that the silica is in the form of individualized particles, with an average diameter comprised between 5 and 100 nm, not linked together with siloxane bonds, that the silane is a vinylsilane of formula (I)

$$H_2C=CH-Si(OR)_3 \quad (I)$$

in which R represents a methyl or ethyl radical, that the multifunctional acrylic monomer is tripropylene glycol diacrylate designated TPGDA and in that they are transparent and colourless as water and stable over time.

In the system according to the present invention the term polymerizable under radiation indicates that the coating can be hardened under ultraviolet radiation in the presence of a photo-initiator or under electron beams without requiring a photo-initiator, and the term polymerizable thermally indicates that the coating can be hardened by thermal treatment in the presence of a radicular catalyst.

A more particular subject of the invention is compositions as defined above, characterized in that they contain from 5 to 60% of silica by weight.

Among these last-named compositions, a particular subject of the invention is the compositions characterized in that they preferably contain from 25 to 35% of silica by weight is in the form of individualized particles, not linked together with siloxane bonds and with an average diameter comprised between 5 and 100 nm, preferably between 10 and 50 nm.

Among the above compositions, there can be more particularly mentioned those characterized in that they contain 0.01 millimole to 0.1 millimole of vinylsilane of formula (I) per m² of silica.

The compositions according to the invention are stable over time. In fact, it was noted that under optimum conditions for appropriate storage, i.e. protected from heat and light, 6 months after the preparation of the product, the solution is still clear, transparent and colourless.

No sedimentation of silica is noticed nor the formation of gels from the silica or silanes. No appearance of cloudy or haze phenomenon is noticed.

The compositions according to the invention are also fluid. Their Brookfield viscosity, determined at 20° C. with a Brookfield RVT apparatus at 780 rev/min is less than 200 mPa.s. They are also virtually free from water and volatile solvents. By weight they contain less than 1.5% and preferably at most 1.2% of water.

The compositions according to the invention are miscible with organic solvents which themselves are miscible with TPGDA. Obviously they can be diluted with TPGDA, so as to reduce, if desired, their silica concentration.

According to the invention, the compositions as defined above can be prepared by a process characterized in that an aqueous acid silica sol containing the desired quantity and grade of silica, the chosen quantity of vinylsilane of formula (I), the desired quantity of TPGDA and isopropyl alcohol, designated IPA is mixed together at ambient temperature and under agitation, so that the quantity of vinylsilane of formula (I) is comprised between 0.01 millimole and 0.1 millimole per m² of silica used, then in that this mixture is subjected to distillation under reduced pressure and under agitation, at a temperature of less than 50° C., until elimination of the water and volatile solvents, in order to obtain a composition according to the invention.

A subject of the present Application is also the above compositions, characterized in that they can be obtained by mixing at ambient temperature and under agitation, an aqueous acid silica sol in which the silica is in the form of individualized particles, with an average diameter comprised between 5 and 100 nm, not linked together with siloxane bonds, said sol containing the desired quantity of tripropyleneglycol and isopropyl alcohol, then by subjecting this mixture to a distillation under reduced pressure and under agitation, at a temperature of less than 50° C. until elimination of the water and volatile solvents.

The silica particles, after elimination of the water and volatile solvents, lose their hydrophilic character and can be dispersed in TPGDA. The stability of the compositions according to the invention is surprising and it is particularly advantageous for their use.

In fact, it is of great interest industrially-speaking to be able to obtain compositions free from solvent and which remain stable over time. This goal was attained by adjusting the quantity of vinylsilane of formula I as a function of the quantity of silica used, and more particularly of the surface area of the particles of colloidal silica used.

Tests were carried out by the Applicant regarding other multifunctional acrylate monomers but the compositions obtained were not stable over time, as they first showed a cloudy phenomenon then gelling after a few weeks.

According to the invention, the aqueous acid silica sol is prepared extemporaneously by treatment according to known techniques with an ion exchange resin in acid form, of an aqueous sol of basic commercial silica with a pH of 8 to 10.

These aqueous silica sols are commercially available, in particular they are marketed by the Applicant under the name KLEBOSOL®.

The aqueous silica sols used in the invention contain up to 60% by weight of silica, in the form of individualized particles, with an average diameter comprised between 5 and 100 nm, not linked together with siloxane bonds with a pH comprised between 1 and 3 and preferably approximately 2. It is known that the majority of silica sols are formed of individualized spherical particles of amorphous, non-porous silica, the interior of the silica particles consists of anhydrous silica with a density of 2.2 g/cm$^3$ (The Chemistry of Silica. R. K. Iler—Wiley Interscience 1979 p.7).

In the hypothesis where the particles consist of amorphous silica with a density of 2,2 g/cm$^3$ it is known that a simple relationship exists between the diameter (d) expressed in nanometers and the specific surface area (S) expressed in m$^2$ per gram. This relationship is:

$$S = \frac{2720}{d}$$

(The Chemistry of Silica. R, K, Iler—Wiley Interscience 1979 p.465). According to the invention, the vinylsilanes of formula (I) and the TPGDA are commercial products.

The TPGDA is in particular marketed by the Company CRAY VALLEY under the trade mark SARTOMER® 306, by the Company UCB/RADCURE under the name TPGDA or by the Company AKROS under the trade mark ACTI-LANE® 424.

Vinyltrimethoxysilane and vinyltriethoxysilane are marketed by the Company HÜLS under the brand name Dynasilan VTMO and Dynasilan VTEU respectively and by the Company WITCO under the brand name SILQUEST A-171 and SILQUEST A-151 respectively.

The compositions according to the invention have useful properties due to their high concentration of silica, their fluidity, their transparency and absence of colour like water and their stability over time. They can easily be deposited on the different types of support described previously, and hardened by thermal, radicular mechanism or by radiation (UV or electron beam) leading to the formation of a thin film having good adhesion to the support and a good resistance to abrasion and scratching, which makes them particularly useful for the manufacture of transparent and colourless protective coatings.

The limpidity of the compositions probably results in the first place from the very small difference in refractive index n between the refractive index of the silane (N=1.46) and that of TPGDA (n=1.45).

The compositions according to the invention have silica particles with a diameter comprised between 10 and 50 nm, therefore they are particularly useful for obtaining anti-scratch varnishes on transparent plastics such as optical glass or transparent plastic materials used in buildings and on other substrates (non-transparent plastic materials, glass, wood, metal).

The following examples illustrate the present invention. In these examples, the water analyses were carried out using the Karl Fischer method and the silica contents were determined by calcination at 1000° C. of a sample of known weight.

EXAMPLE 1

The following are mixed together under agitation at ambient temperature:

833 g of a freshly prepared acid silica sol, containing 70% water by weight, i.e. 583.1 g of water and 30% silica, i.e. 249.9 g of silica, in the form of individualized particles, with an average diameter of 25 nm, not linked together with siloxane bonds and with a pH=2.

4182 g of isopropyl alcohol, i.e. 717% by weight relative to the water of the aqueous silica sol, 422 g of tripropylene glycol diacrylate, i.e. 1.47 mole of TPGDA 109 g of vinyltrimethoxysilane, i.e. 0.0273 millimole of silane per m$^2$ of silica.

The reaction mixture thus obtained is then subjected to a distillation under reduced pressure of approximately 115 mbars while maintaining the temperature of the external bath at approximately 42° C. After distillation for approximately 3 hours, the temperature of the external bath is progressively taken to 46±1° C. and the pressure to 20 mbars and the distillation is continued for 30 minutes, the reduced pressure is broken and the reaction medium is cooled down to ambient temperature.

In this way a solution which is clear, limpid, transparent, colourless as water and stable over time is obtained containing 37% silica and 0.84% water by weight and having a Brookfield viscosity of 100 mPa·s, determined at 20°, at a speed of 780 rev/min.

It is noted that under appropriate storage conditions, i.e. sheltered from heat and light, 6 months after the preparation, the solution is still clear, limpid, transparent, colourless as water and stable, i.e. no appearance of cloudy or haze phenomenon is noticed, the solution is still homogeneous, even after storage for six months under the conditions mentioned previously.

EXAMPLE 2

The following are mixed together under agitation at ambient temperature:

833 g of a freshly prepared acid silica sol, containing 70% water by weight, i.e. 583.1 g of water and 30% silica in the form of individualized particles, i.e. 249.9 g of silica, with an average diameter of 25 nm, not linked together with siloxane bonds and with a pH=2.

4182 g of isopropyl alcohol, i.e. 717% by weight relative to the water of the aqueous silica sol, 442 g of tripropylene glycol diacrylate, i.e. 1.47 mole of TPGDA 218 g of vinyltrimethoxysilane, i.e. 0.0546 millimole of silane per m² of silica.

The reaction mixture thus obtained is treated as in Example 1.

In this way a solution which is clear, limpid, transparent, colourless as water and stable over time is obtained containing 43% silica and 0.43% water by weight and having a Brookfield viscosity of 90 mPa·s, determined at 20° C., at a speed of 780 rev/min.

It is noted that as in Example 1, a solution is obtained which is still clear, limpid, transparent, colourless as water and stable over time, even after storage for six months under appropriate conditions of being sheltered from heat and light.

EXAMPLE 3

The following are mixed together at ambient temperature:

833 g of a freshly prepared acid silica sol, containing 70% water by weight, i.e. 583.1 g of water and 30% silica in the form of individualized particles, i.e. 249.9 g of silica, with an average diameter of 12 nm, not linked together with siloxane bonds and with a pH=2.

4182 g of isopropyl alcohol, i.e. 717% by weight relative to the water of the aqueous silica sol, 442 g of tripropylene glycol diacrylate, i.e. 1.47 mole of TPGDA 218 g of vinyltrimethoxysilane, i.e. 0.0262 millimole of silane per m² of silica.

The reaction mixture thus obtained is treated as in Example 1.

In this way a solution which is clear, limpid, transparent, colourless as water and stable over time is obtained containing 38% silica and 1.2% water by weight and having a Brookfield viscosity of 90 mPa.s, determined at 20° C., at a speed of 780 rev/min.

It is noted that as in Example 1, a solution is obtained which is still clear, limpid, transparent, colourless as water and stable over time, even after storage for six months under appropriate conditions of being sheltered from heat and light.

EXAMPLE 4

Example of the use of formulations according to the invention for the realisation of coatings which are transparent and colourless as water and resistant to abrasion and scratches.

a) Firstly, the following formulation is prepared by mixing at ambient temperature of 20° C.

30 parts by weight of the silica organosol of Example 1.

70 parts by weight of a polyether acrylate modified amine oligomer, for example the oligomer CN 551 from Cray Valley.

3 parts by weight of a 1/1 mixture by weight of 1-hydroxy-cyclohexyl-phenylketone and benzophenone, for example Irgacure 500 from Ciba Geigy.

b) The mixture thus obtained is deposited on a glass support at the rate of approximately 50 g/m². The glass support coated in this way is placed on a conveyor which moves at a speed of 25 meters per minute, the coating being irradiated by ultraviolet radiation originating from a Fusion-Systems lamp with a power rating of 120 W/cm.

c) The resistance to abrasion of the coating hardened in this way was evaluated by the Taber abrasion test with two CS 17 abrasive wheels and an applied weight of 1000 g on each of them. After 1000 cycles a weight loss of 7 mg is thus obtained. With the same formulation without the silica organosol of Example 1, under the same operating conditions, a weight loss of 30 mg is obtained. A very clear improvement of the resistance to abrasion is thus observed.

d) with the steel wool qualitative test, a very good improvement in the resistance to scratching of the coating containing the organosol of example 1 is observed relative to the coating without organosol.

What is claimed is:

1. Silicoacrylic compositions which are fluid, polymerizable thermally or by radiation, by a radicular mechanism, with less than 1.5% and volatile solvent content containing silica, a silane and a multifunctional acrylic monomer, characterized in that the silica is in the form of individualized particles, with an average diameter comprised between 5 and 100 nm, not linked together with siloxane bonds, that the silane is a vinylsilane of formula (I)

$$H_2C=CH-Si(OR)_3 \qquad (I)$$

in which R represents a methyl or ethyl radical, that the multifunctional acrylic monomer is tripropylene glycol diacrylate designated TPGDA, in that the quantity of vinylsilane of formula I is comprised between 0.01 millimole and 0.1 millimole per m² of silica used and in that they are transparent and colourless as water and stable over time.

2. Compositions according to claim 1, characterized in that they contain from 5 to 60% by weight of silica.

3. Compositions according to claim 2, characterized in that they contain from 25 to 35% by weight of silica.

4. Compositions according to claim 3, characterized in that they contain silica in the form of individualized particles, not linked together with siloxane bonds, having an average diameter comprised between 10 and 50 nm.

5. Compositions according to claim 4, characterized in that they can be obtained by mixing together at ambient temperature, under agitation, an aqueous acid silica sol in which the silica is in the form of individualized particles, with an average diameter comprised between 5 and 100 nm, not linked together with siloxane bonds, said sol containing the desired quantity of tripropyleneglycol diacrylate and isopropyl alcohol, then by subjecting this mixture to a distillation under reduced pressure and under agitation, at a temperature of less than 50° C. until elimination of the water and volatile solvents.

6. Preparation process for a composition according to claim 5, characterized in that the following are mixed together at ambient temperature and under agitation: an aqueous acid silica sol containing the desired quantity and grade of silica, the chosen quantity of vinylsilane of formula (I), the desired quantity of tripropylene glycol diacrylate and isopropyl alcohol, then in that this mixture is subjected to a distillation under reduced pressure and under agitation, at a temperature of less than 50° C. until elimination of the water and volatile solvents.

7. Process according to claim 6, characterized in that the aqueous silica sol has a pH of 1 to 3.

8. Composition according to claim 2, characterized in that it contains silica in the form of individualized particles, not linked together with siloxane bonds, having an average diameter between 10 and 50 nm.

9. Composition according to claim 8, characterized in that it can be obtained by mixing together at ambient temperature, under agitation, an aqueous acid silica sol in which the silica is in the form of individualized particles, with an average diameter between 5 and 100 nm, not linked together with siloxane bonds, said sol containing a predetermined quantity of tripropyleneglycol diacrylate and isopropyl alcohol, then by subjecting this mixture to distillation under reduced pressure and under agitation, at a temperature of less than 50° C. until elimination of the water and volatile solvents.

10. Composition according to claim 1, characterized in that it contains silica in the form of individualized particles, not linked together with siloxane bonds, having an average diameter between 10 and 50 nm.

11. Composition according to claim 10, characterized in that it can be obtained by mixing together at ambient temperature, under agitation, an aqueous acid silica sol in which the silica is in the form of individualized particles, with an average diameter between 5 and 100 nm, not linked together with siloxane bonds, said sol containing a predetermined quantity of tripropyleneglycol diacrylate and isopropyl alcohol, then by subjecting this mixture to distillation under reduced pressure and under agitation, at a temperature of less than 50° C. until elimination of the water and volatile solvents.

12. Composition according to claim 1, characterized in that it can be obtained by mixing together at ambient temperature, under agitation, an aqueous acid silica sol in which the silica is in the form of individualized particles, with an average diameter between 5 and 100 nm, not linked together with siloxane bonds, said sol containing a predetermined quantity of tripropyleneglycol diacrylate and isopropyl alcohol, then by subjecting this mixture to distillation under reduced pressure and under agitation, at a temperature of less than 50° C. until elimination of the water and volatile solvents.

13. Composition according to claim 2, characterized in that it can be obtained by mixing together at ambient temperature, under agitation, an aqueous acid silica sol in which the silica is in the form of individualized particles, with an average diameter between 5 and 100 nm, not linked together with siloxane bonds, said sol containing a predetermined quantity of tripropyleneglycol diacrylate and isopropyl alcohol, then by subjecting this mixture to distillation under reduced pressure and under agitation, at a temperature of less than 50° C. until elimination of the water and volatile solvents.

14. Composition according to claim 3, characterized in that it can be obtained by mixing together at ambient temperature, under agitation, an aqueous acid silica sol in which the silica is in the form of individualized particles, with an average diameter between 5 and 100 nm, not linked together with siloxane bonds, said sol containing a predetermined quantity of tripropyleneglycol diacrylate and isopropyl alcohol, then by subjecting this mixture to distillation under reduced pressure and under agitation, at a temperature of less than 50° C. until elimination of the water and volatile solvents.

15. In a method of coating a surface with a transparent protective coating composition, the improvement wherein said coating composition is the composition of claim 1.

16. A method according to claim 15, comprising curing said composition thermally, by radiation or by ridicular polymerization.

17. In a method of coating a surface with a transparent protective coating composition, the improvement wherein said coating composition is the composition of claim 4.

18. A method according to claim 17, comprising curing said composition thermally, by radiation or by ridicular polymerization.

19. In a method of coating a surface with a transparent protective coating composition, the improvement wherein said coating composition is the composition of claim 5.

20. A method according to claim 19, comprising curing said composition thermally, by radiation or by ridicular polymerization.

\* \* \* \* \*